(12) United States Patent
Coulson

(10) Patent No.: US 10,954,912 B2
(45) Date of Patent: Mar. 23, 2021

(54) HYDRAULIC MACHINE COMPRISING A RADIAL FLOW RUNNER

(71) Applicant: Voith Patent GmbH, Heidenheim (DE)

(72) Inventor: Stuart Coulson, Seven Valleys, PA (US)

(73) Assignee: Voith Patent GmbH, Heidenheim (DE)

( * ) Notice: Subject to any disclaimer, the term of this patent is extended or adjusted under 35 U.S.C. 154(b) by 64 days.

(21) Appl. No.: 16/520,925

(22) Filed: Jul. 24, 2019

(65) Prior Publication Data

US 2019/0345952 A1 Nov. 14, 2019

Related U.S. Application Data

(63) Continuation of application No. PCT/EP2017/081661, filed on Dec. 6, 2017.

(Continued)

(51) Int. Cl.
*F03B 3/12* (2006.01)
*F03B 3/02* (2006.01)
(Continued)

(52) U.S. Cl.
CPC ............... *F03B 3/125* (2013.01); *F03B 3/02* (2013.01); *F03B 11/006* (2013.01); *F04D 3/005* (2013.01);
(Continued)

(58) Field of Classification Search
CPC .................................................... F04D 29/168
See application file for complete search history.

(56) References Cited

U.S. PATENT DOCUMENTS 1,820,150 A 8/1931 Moody
4,086,020 A 4/1978 Tanabe et al.
(Continued)

FOREIGN PATENT DOCUMENTS

JP 59-20572 A 2/1984
JP 2002-235652 A 8/2002
(Continued)

OTHER PUBLICATIONS

Notification of Transmittal of the International Search Report and the Written Opinion of the International Searching Authority, or the Declaration dated Mar. 2, 2018 for International Application No. PCT/EP2017/081661 (14 pages).

*Primary Examiner* — Justin D Seabe
*Assistant Examiner* — Jason G Davis
(74) *Attorney, Agent, or Firm* — Taylor IP, P.C.

(57) ABSTRACT

A hydraulic machine including a runner of Francis type, a head cover and a lower cover, the runner includes a low and a high pressure side, a crown, a band, and a plurality of blades, the crown having a sealing element to seal the space between the crown and head cover against water from the high-pressure side, whereas the runner has at least one passage to drain high-pressure leakage water passing the sealing element to the low-pressure side, and the passage has an inlet aperture located in a portion of the crown which during operation is exposed to high-pressure leakage water, the passage being located within one of the blades and leads from the inlet aperture to the band, where the passage forms an opening leading to the space between the band and the lower cover.

5 Claims, 3 Drawing Sheets

Related U.S. Application Data

(60) Provisional application No. 62/449,835, filed on Jan. 24, 2017, provisional application No. 62/519,472, filed on Jun. 14, 2017, provisional application No. 62/545,135, filed on Aug. 14, 2017.

(51) Int. Cl.
*F03B 11/00* (2006.01)
*F04D 3/00* (2006.01)
*F04D 29/16* (2006.01)

(52) U.S. Cl.
CPC ........ *F04D 29/168* (2013.01); *F05B 2220/32* (2013.01)

(56) References Cited

U.S. PATENT DOCUMENTS

| | | | |
|---|---|---|---|
| 5,823,740 A | 10/1998 | Cybularz et al. | |
| 5,924,842 A * | 7/1999 | Beyer | F03B 11/00 415/115 |
| 6,155,783 A * | 12/2000 | Beyer | F03B 3/02 416/90 R |
| 6,524,063 B1 * | 2/2003 | Beyer | F03B 3/125 415/115 |

FOREIGN PATENT DOCUMENTS

| | | |
|---|---|---|
| JP | 2007-154667 A | 6/2007 |
| JP | 2011-137407 A | 7/2011 |

* cited by examiner

HYDRAULIC MACHINE COMPRISING A RADIAL FLOW RUNNER

CROSS REFERENCE TO RELATED APPLICATIONS

This is a continuation of PCT application No. PCT/EP2017/081661, entitled "HYDRAULIC MACHINE COMPRISING A RADIAL FLOW RUNNER", filed Dec. 6, 2017, which is incorporated herein by reference. PCT application No. PCT/EP2017/081661 is a non-provisional application based upon U.S. provisional patent application Ser. No. 62/449,835, entitled "RUNNER FOR A HYDRAULIC TURBINE OR PUMP", filed Jan. 24, 2017, U.S. provisional patent application Ser. No. 62/519,472, entitled "RADIAL FLOW RUNNER FOR A HYDRAULIC MACHINE", filed Jun. 14, 2017, and U.S. provisional patent application Ser. No. 62/545,135, entitled "HYDRAULIC MACHINE COMPRISING A RADIAL FLOW RUNNER", filed Aug. 14, 2017, which are incorporated herein by reference.

BACKGROUND OF THE INVENTION

1. Field of the Invention

The present invention relates generally to hydroelectric turbine or pump installations that include a radial flow runner of the Francis type.

2. Description of the Related Art

Hydraulic machines comprising a radial flow runner of the Francis type are suffering from axial thrust applied to the runner of the hydraulic machine. Since the sealing between the runner and the high-pressure side of the water passage cannot be made perfectly tight, pressurized water can get in the space between the head cover of the hydraulic machine and the runner crown resulting in a high axial thrust. To reduce the axial thrust prior art has proposed several concepts. One concept comprises balancing pipes draining the water passing the seals to the low-pressure side of the water passage (see e.g. U.S. Pat. No. 1,820,150 to Moody).

Another concept comprises balance holes within the runner crown leading to the runner hub or to the space between the blades of the runner (see e.g. U.S. Pat. No. 4,086,020 to Seiichi and Syoji). Balancing pipes are expensive. The effectiveness of the prior art balancing holes depends on the revolution speed of the runner and the blade geometry and therefore leading not always to satisfactory results concerning thrust reduction. Especially in the case of modernization projects when an existing runner relying on balancing holes has to be replaced by a new runner the situation can occur that the modern blade geometry cannot be accommodated by balancing holes of the known type and the installation of balancing pipes is impractical since the existing hydraulic machine is embedded in concrete.

It is desirable in many modernization projects to have new runners with blades which extend closer to the axis of rotation at the trailing edge near runner crown. This geometry provides improved performance characteristics but, in many cases, makes the use of balancing holes in the runner crown less effective at reducing thrust due to radial pumping effects within the runner crown space below the shaft flange. In some cases where the flange connecting the runner to the shaft is at a relatively low elevation, there may no longer be sufficient space available in the runner crown flange to accommodate balancing holes of the known type and so an alternative solution for thrust reduction is necessary.

What is needed is a way of reducing the axial thrust of a radial flow runner that is less expensive than balancing pipes and easily applicable within modernization projects.

SUMMARY OF THE INVENTION

The present invention provides a hydraulic machine including a runner of a Francis type, a head cover and a lower cover, the runner includes a low and a high pressure side, a crown, a band, and a plurality of blades, the crown having a sealing element to seal the space between the crown and head cover against water from the high-pressure side, whereas the runner has at least one passage to drain high-pressure leakage water passing the sealing element to the low-pressure side, and the passage has an inlet aperture located in a portion of the crown which during operation is exposed to high-pressure leakage water, the passage being located within at least one of the blades and leads from the inlet aperture to the band, where the passage forms an opening leading to the space between the band and the lower cover.

Advantageously, the axial thrust can be reduced by a runner having at least one passage leading from the runner crown to the runner band whereas the passage is located within one of the runner blades.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
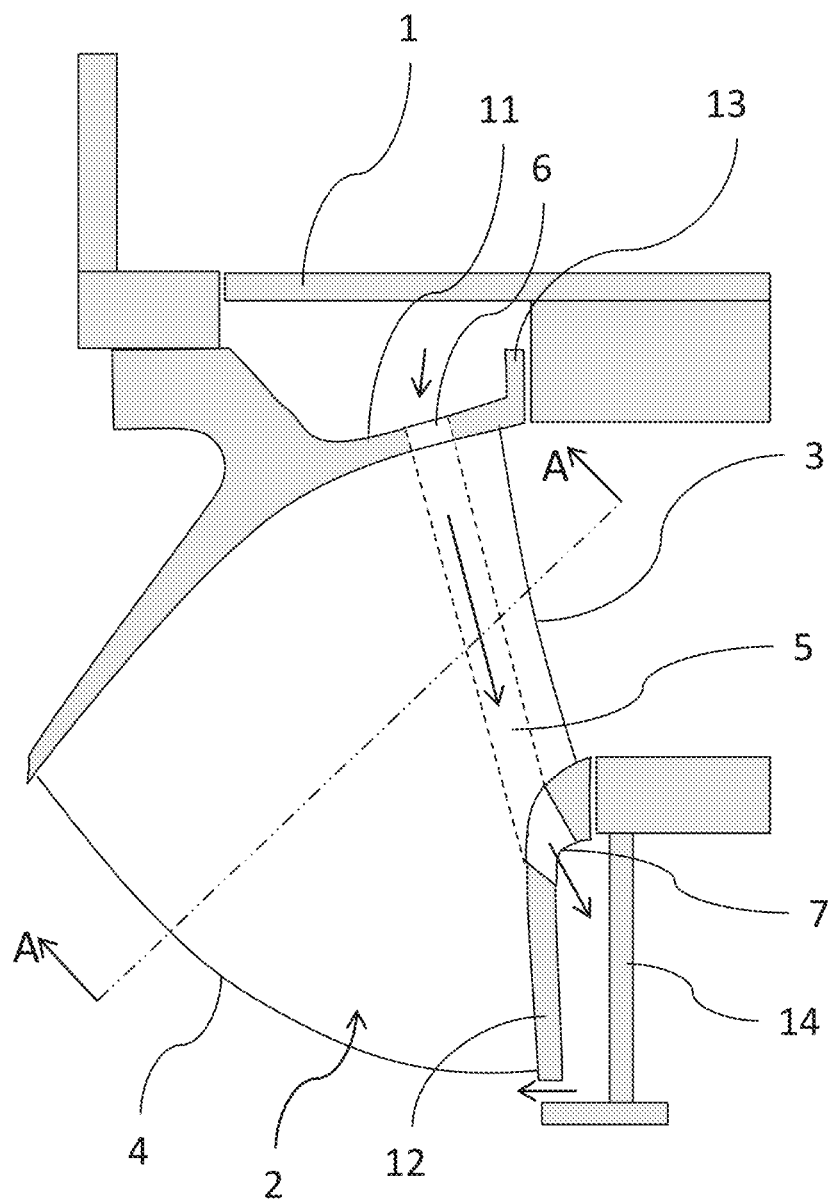
FIG. 1 is a cross-sectional view of a portion of an embodiment of a Francis turbine according to the present invention.

Referring now to the drawings and more particularly to FIG. 1 there is shown in a schematic form a cross-sectional view of a hydraulic machine including an embodiment of a Francis type runner according to the present invention. The head cover is designated as 1 and the lower cover as 14. The runner includes a runner crown 11. A runner blade 2 extends between runner crown 11 and a band 12. Runner blade 2 has two edges designate by 3 and 4. The fluid entering the runner flows from edge 3 towards edge 4, whereas the high-pressure side adjoins to edge 3 and the low-pressure side adjoins to edge 4. In a pumping mode the flow direction of the fluid is reversed. Runner crown 11 includes a circumferential located sealing element 13. Sealing elements 13 are construed to seal the space between head cover 1 and crown 11 against high-pressure water. However due to the imperfection of the sealing a small amount of high-pressure water will be present in the space above runner crown 11 leading to an undesired axial thrust. The runner crown 11 includes an inlet aperture 6. Inlet aperture 6 is located in a portion of crown 11, which is exposed to high-pressure water passing sealing element 13. Blade 2 includes a passage 5. Passage 5 leads from inlet aperture 6 to band 12 where passage 5 forms an opening 7. The axial thrust is relieved by draining the leakage water from the space above crown 11 directly through passage 5 inside blade 2 and opening 7 to a chamber which is located between band 12 and lower cover 14. This chamber is connected to the low-pressure side of runner 2. The flow of the leakage water is indicated by arrows. The dash-dotted line on the left side of FIG. 1 indicates the axis of rotation of the runner.

Since opening 7 is ideally located at an equal or even slightly larger radial distance from the axis of rotation than inlet aperture 6 backpressure is avoided due to the radial pumping effect of rotation. Therefore, the runner, according to the present invention, relieves the thrust to lower values compared with the runner of U.S. Pat. No. 4,086,020, because the balancing holes of U.S. Pat. No. 4,086,020, leading to the hub and the space between the blades, do not adjoin directly to the low-pressure side of the runner. The radial pumping effect within the hub of U.S. Pat. No. 4,086,020 is significant and results in higher pressure above the runner and consequently higher axial downthrust.

Figure 2:
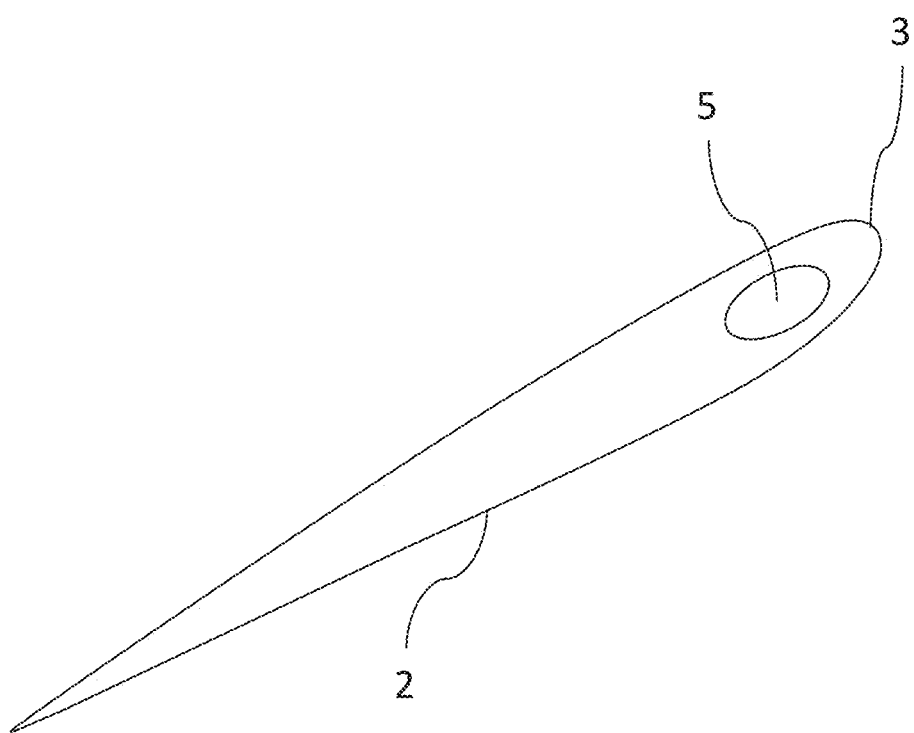
FIG. 2 shows a section taken along A-A according to a first embodiment of a runner blade according to FIG. 1.

Now, additionally referring to FIG. 2 there is schematically shown a cross-sectional view through blade 2 of FIG. 1 along the marked section A-A. Passage 5 is located near edge 3 adjoining the high-pressure side of blade 2. This part of blade 2 is typically relatively thick and straight. Normally blade 2 is machined from a casting. Passage 5 according to the embodiment of FIG. 2 is formed directly while casting blade 2, which is thus of single piece construction.

Figure 3:
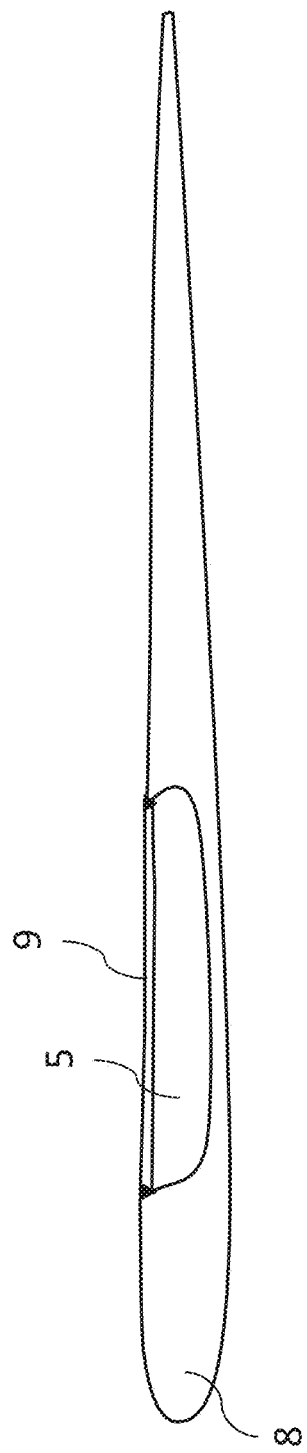
FIG. 3 shows section A-A according to another embodiment of a runner blade according to FIG. 1.

Now, additionally referring to FIG. 3 there is schematically shown a cross-sectional view through blade 2 of FIG. 1 along the marked section A-A according to another embodiment of the present invention. In the view along section A-A it can be seen that blade 2 has a base part 8 and a cover part 9. Base part 8 includes either the entire suction side or pressure side surface of the blade, as well as the entire surface of the edge adjoining the high-pressure side and the entire surface of the edge adjoining the low-pressure side. A cavity is machined or cast into base part 8. The thinner cover part 9 is attached to base part 8 thus forming passage 5. Cover part 9 may be metal or composite material, may be cast formed or machined and may be attached by welding or by a bonding material (epoxy, glue, etc.).

The blade could also be produced with a cavity directly by rapid prototyping methods such as additive manufacturing.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic machine comprising:
    a runner of a Francis type;
    a head cover; and
    a lower cover, whereas the runner includes:
        a low-pressure side;
        a high-pressure side;
        a crown;
        a band; and
        a plurality of blades, each blade having:
            a pressure surface;
            an oppositely facing suction surface;
            an edge adjoining the high-pressure side; and
            a spaced apart edge adjoining the low-pressure side of the runner, whereas the crown includes a sealing element to seal a space between the crown and the head cover against water from the high-pressure side, the runner having at least one passage draining high-pressure leakage water passing the sealing element to the low-pressure side, and the at least one passage has an inlet aperture located in a portion of the crown which during operation is exposed to the high-pressure leakage water, the at least one passage being located within at least one of the blades, the at least one passage leads from the inlet aperture to the band where the passage forms an opening leading to a space between the band and the lower cover, the space being in connection with the low-pressure side of the runner.

2. The hydraulic machine of claim 1, wherein the at least one blade in which the at least one passage is located is of single piece construction and is machined from a casting including the at least one passage.

3. The hydraulic machine of claim 1, wherein the at least one blade in which the at least one passage is located includes:
    a base part; and
    a cover part, the base part being of single piece construction including the entire edge adjoining the high-pressure side, the entire pressure side of the at least one blade, as well as the entire surface of the edge adjoining the low-pressure side, the base part containing a cavity and the cover part being attached to the base part above the cavity to form the at least one passage.

4. The hydraulic machine of claim 1, wherein the at least one blade in which the at least one passage is located includes:
    a base part; and
    a cover part, the base part being of single piece construction including the entire edge adjoining the high-pressure side, the entire suction side of the at least one blade, as well as the entire surface of the edge adjoining the low-pressure side, the base part containing a cavity, the cover part being attached to the base part above the cavity to form the at least one passage.

5. The hydraulic machine of claim 1, wherein the at least one blade in which the at least one passage is located is of single piece construction and is produced by a rapid prototyping method including additive manufacturing.

* * * * *